United States Patent
Wood, Jr. et al.

(10) Patent No.: US 8,740,741 B2
(45) Date of Patent: Jun. 3, 2014

(54) EFFECTIVE COOLING SYSTEM FOR LIMITED SLIP DIFFERENTIAL ASSEMBLY

(75) Inventors: Robert L. Wood, Jr., Independence, KS (US); Michael J. Cliff, Coffeyville, KS (US); Craig R. Eike, Coffeyville, KS (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/229,119

(22) Filed: Sep. 9, 2011

(65) Prior Publication Data

US 2013/0065720 A1 Mar. 14, 2013

(51) Int. Cl.
*F16H 48/20* (2012.01)

(52) U.S. Cl.
USPC ............ 475/160; 475/231; 475/238; 475/239

(58) Field of Classification Search
USPC .................. 475/159, 160, 230, 231, 238, 239
See application file for complete search history.

(56) References Cited

U.S. PATENT DOCUMENTS

| | | | |
|---|---|---|---|
| 3,748,928 A * | 7/1973 | Shiber | 475/88 |
| 5,611,746 A * | 3/1997 | Shaffer | 475/234 |
| 2010/0300776 A1 | 12/2010 | Cliff et al. | |

FOREIGN PATENT DOCUMENTS

| | | |
|---|---|---|
| JP | 2261946 A | 10/1990 |
| WO | 0111268 A1 | 2/2001 |

OTHER PUBLICATIONS

European Search Report dated Jan. 4, 2013 (6 pages).

* cited by examiner

*Primary Examiner* — Derek D Knight
(74) *Attorney, Agent, or Firm* — Quarles & Brady LLP

(57) ABSTRACT

A differential axle assembly for a work machine having a differential lock capability. The differential axle has a differential gear housing, which utilizes a sealed housing on the outside thereof and a bleed flow path for pressurized liquid lubricant actuating a differential lock feature to provide adequate cooling flow for the differential gear set and differential lock mechanism under heavy duty circumstances.

20 Claims, 2 Drawing Sheets

US 8,740,741 B2

EFFECTIVE COOLING SYSTEM FOR LIMITED SLIP DIFFERENTIAL ASSEMBLY

FIELD OF THE INVENTION

The present invention relates to work machines axles having differential gears and limited slip capability.

BACKGROUND OF THE INVENTION

Over the years, work machines, particularly those that operate off highway, require a differential drive mechanism for sets of wheels to accommodate vehicle turning, but, in addition, require a limited slip feature so that torque may be transferred from a slipping wheel to one that can obtain better traction. This has evolved design efforts to the point where axles can accommodate significant torque levels and, at the same time, deal with variable traction on one or the other of the drive wheels. Design efforts have taken place that minimize windage losses in axle assemblies where a portion, or all, of the differential gears are immersed in a lubricating liquid. As a result of the improvements in reducing windage losses, the ability to cool and lubricate various components in the differential gear assembly is challenged. Specifically, the ability to provide adequate lubrication for all of the gears is constrained by the need for reducing windage losses.

Accordingly, a need exists for an axle assembly with a differential feature that provides adequate lubrication of the components while, at the same time, reducing windage losses of the axle set.

SUMMARY

In one form, the invention is a power train axle assembly including an elongated housing and first and second shafts journaled in the elongated housing for providing a rotary output shaft at the outer ends thereof. A differential gear housing is rotatably positioned within the elongated housing and receives the inner ends of the first and second shafts. A ring gear is fixed to the differential gear housing for receiving a rotary power input. A differential gear set is positioned within the differential gear set housing and has opposed gears fixed to the inner ends of the first and second shaft and are journaled relative to the differential gear set housing. A plurality of planetary gears are journaled within the differential gear housing and mesh with the opposed gears for providing a differential action. A fluid pressure actuated differential lock mechanism has one portion thereof fixed to the differential gear housing and the other to one of the opposed gears. A source of selective fluid pressure is fluidly connected to the differential lock mechanism and provides high and low pressure levels to selectively lock the differential gear housing and one of the gears. The differential gear housing has a bleed flow path to provide pressurized fluid flow into the differential gear housing irrespective of the pressure level with the differential gear housing having a controlled seal so that fluid passes inward and out to lubricate the gears.

In another form, the invention is a work machine including a frame, a prime mover supplying power to the work machine, and a power train including an axle assembly, which has an elongated housing and first and second shafts journaled in the housing for providing a rotary output to wheels at outer ends of the first and second shafts. A differential gear housing is rotatably positioned within the elongated housing and receives the inner ends of the first and second shafts. A ring gear is fixed to the differential gear housing for receiving a rotary power input from the prime mover. A differential gear set is positioned within the differential gear housing and has opposed gears affixed to the inner ends of the first and second shafts with the gears being journaled relative to the differential gear housing. A plurality of planetary gears are journaled within the differential gear housing and mesh with the opposed gears for providing a differential action. A fluid pressure actuated lock mechanism has one portion thereof fixed to the differential gear housing and the other to one of the opposed gears. A source of selective fluid pressure is fluidly connected to the differential lock mechanism and provides high and low pressure levels to selectively lock and unlock the differential gear housing and one of the gears. The differential gear housing has a bleed flow path to provide pressurized flow into the differential gear housing interior irrespective of the pressure level with the differential gear housing having a controlled seal so that fluid passes inward and out to lubricate the gears.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate one embodiment of the invention and such exemplifications are not to be construed as limiting the scope of the invention in any manner.

DETAILED DESCRIPTION

Figure 1:
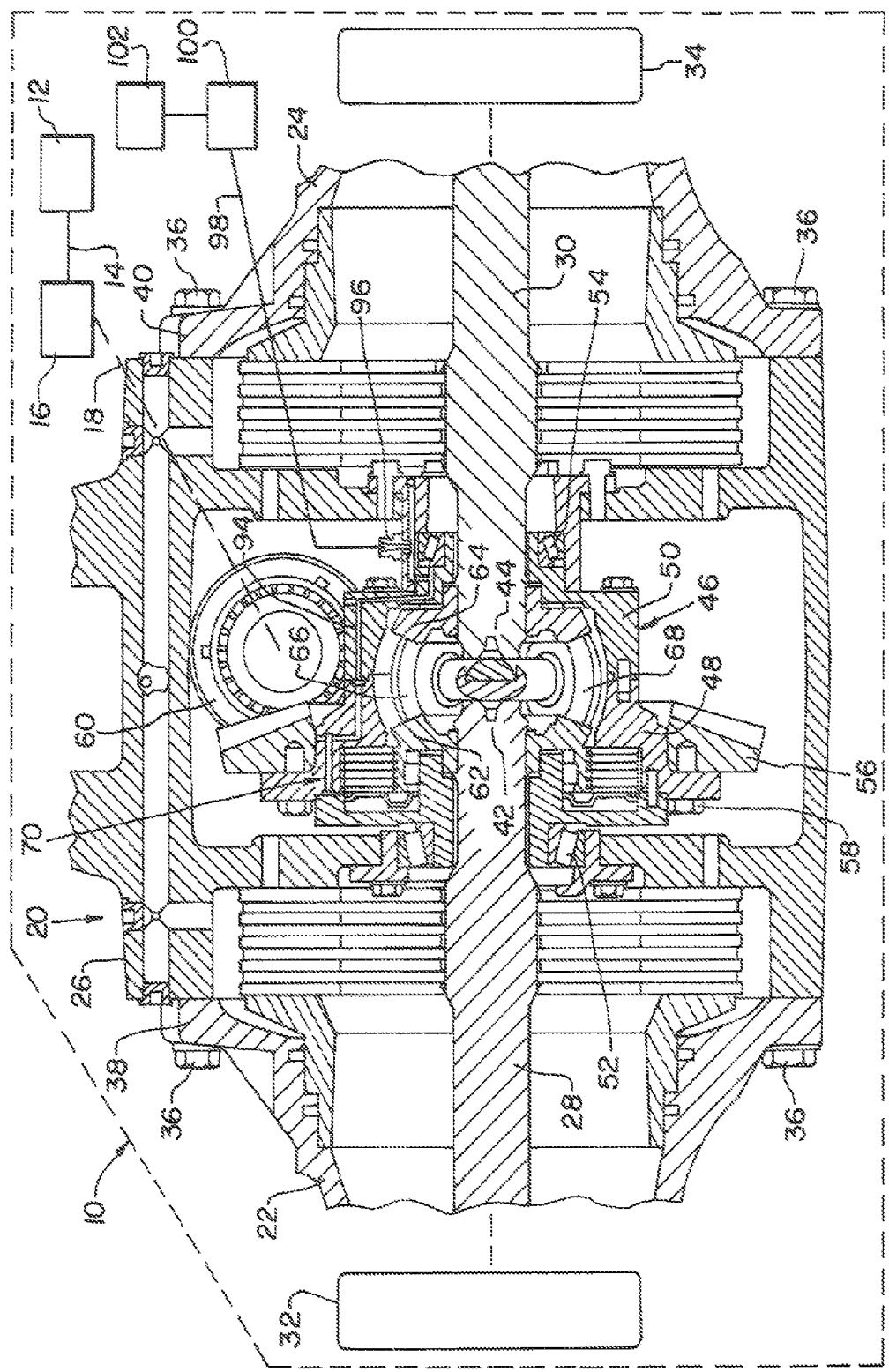
FIG. 1 is a longitudinal section view of a work machine and an axle assembly embodying the present invention along with schematic illustrations of interconnections to additional components of the work machine.

Referring now to the drawings, and more particularly to FIG. 1, there is shown a work machine 10, which includes a frame and a prime mover 12 mounted in the frame, usually in the form of a compression ignition, or diesel engine, 12, which is mechanically interconnected by a shaft 14 to an appropriate transmission 16 and through mechanical connection 18 to an axle assembly generally indicated by reference character 20. Axle assembly 20 includes left and right elongated housings 22 and 24 respectively mounted from a central housing 26. Elongated housings 22 and 24 provide a journal support for shafts 28 and 30 extending to wheels 32 and 34 respectively. It should be apparent to those skilled in the art that the shafts 28 and 30 may be connected to the respective wheels through reduction gear sets in order to provide the torque requirements demanded of heavy duty work machines. The central housing 26 is generally annular in form, is appropriately suspended from work machine 10, and provides a mounting for housings 22 through flange 38 by screws 36 and through flange 40 or housing 24 also by screws 36. The outer ends of shafts 28 and 30 are connected to the wheels 32 and 34 respectively and the inner ends 42 and 44 extend into a differential gear housing 46 positioned within central housing 26.

Differential gear housing 46 has first and second annular housings 48 and 50 interconnected at about the center line thereof. As described below, annular housings 48 and 50 have a substantially sealed outer periphery so as to retain any liquid introduced to the interior thereof within the differential gear housing 46. Housings 48 and 50 are journaled for rotation within the elongated housing 20 by bearing assemblies 52 and 54 respectively, ultimately fixed to the central housing 26. The differential gearing housing half 48 has affixed to it a ring gear 56 by screws 58. Ring gear 56 intermeshes with an UNSEEN input PINION gear receiving input from mechanical interconnection 18. A pair of opposed end gears 62 and 64 are splined to and fixed to the inner ends of shafts 42 and 44 and are positioned within the differential gear housing 46.

As shown herein, end gear 62 and 64 are bevel gears and intermesh with bevel planetary gears 66 and 68 journaled within a differential gear housing 46. As such, the input from prime mover 12 through ring gear 56 to differential gear housing 46 is transmitted to shafts 28 and 30 through planetary gears 66 and 68. As a result, the differential load on the wheels is accommodated through the differential action of the planetary gear set 66 and 68 in a manner that is well-known and understood.

Figure 2:
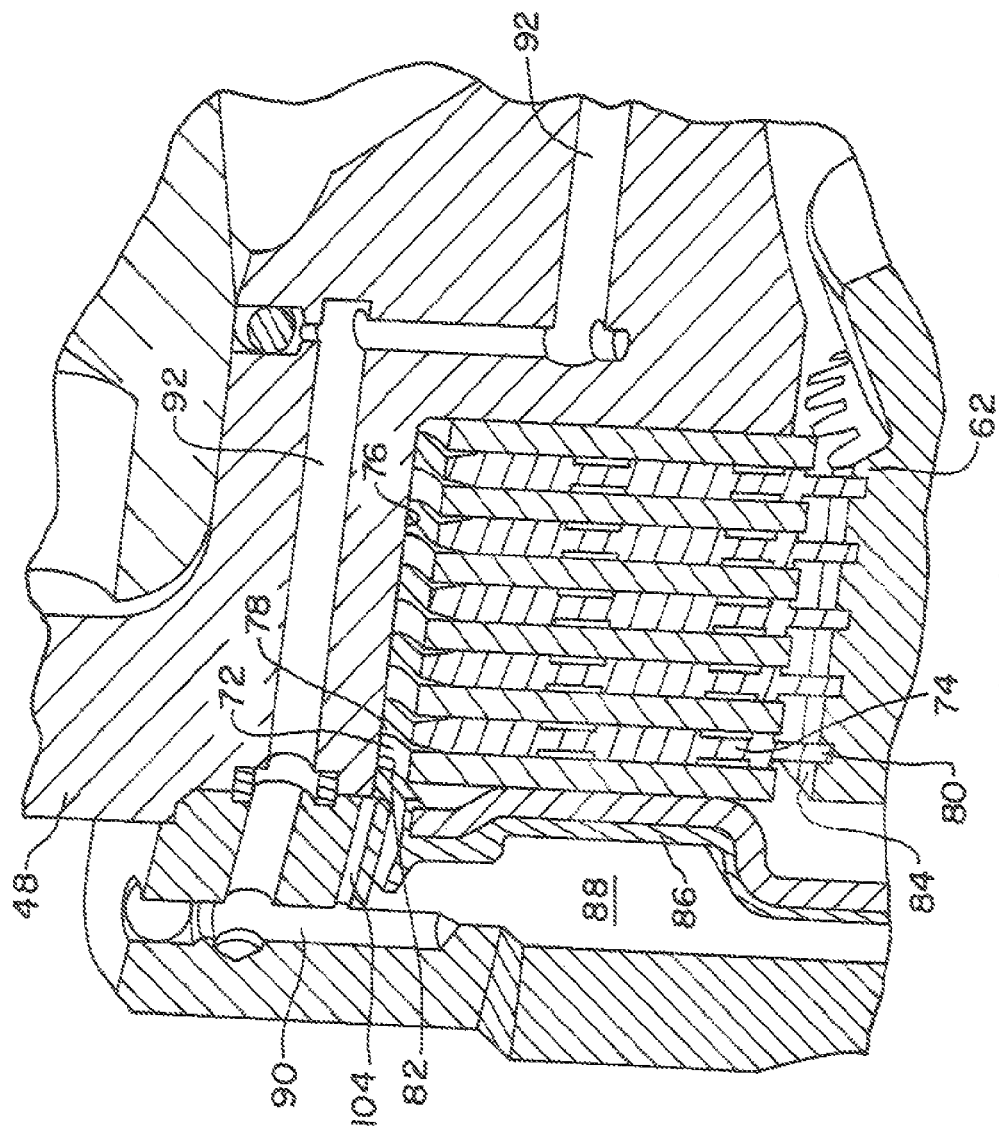
FIG. 2 is an expanded view of a portion of the axle assembly of FIG. 1 showing a lubricant flow path.

Because work machine 10 is heavy duty and frequently used off road where there is a difference in traction between wheels 32 and 34, a differential lock mechanism 70 is provided that selectively interconnects one of the shafts (in this case, shaft 28) to the differential gear housing 46 so as to transfer load between the shafts 28 and 30. Differential lock mechanism 70 comprises an interdigitated series of annular plates 72 and 74 received within chamber 76 in housing 48 (see FIG. 2). The annular plates 72 and 74 each have tabs 78 and 80 respectively received within slots 82 and 84 in the housing 48 and end gear 62 respectively. Plates 72 and 74 are acted on by an annular piston assembly 86 also received within chamber 76 and abutting an axial end face of one of the annular interdigitated plates 72. To the left of piston assembly 86, as shown in FIG. 2, there is a chamber 88 fluidly connected via primary passage 90 and 92 extending through housing 48 to passages 94 in housing 50 and ultimately to a connector 96 fixed to central housing 20. The interconnection between the passages 92 and 94 and fitting 96 permits transmission of pressure when there is relative rotation between the differential gear housing 46 and central housing 20.

Pressure fitting 96 connects with an appropriate line 98 to a controller 100 directing pressurized flow from a pressurized flow source 102 through passages 98, fitting 96, passages 94 and 92 to chamber 88. As illustrated herein, the fluid pressurized by system 102 is lubricant used to both reduce friction between the adjacent relatively rotating bearing parts and to provide a cooling function for the multi plate differential lock. The control system 100 uses appropriate control logic to apply the differential lock mechanism 70 as-needed to transfer torque from one axle to the other in conditions in which one of the two wheels has reduced traction.

The differential axle assembly 20 is of a type that has efficient utilization of lubricant flow in order to reduce windage losses caused by gears rotating through liquid lubricant. In a standard differential housing arrangement, the housing for the opposed gears and planetary gears is significantly porous so that the differential gear set, when rotating, splashes through the liquid level within a chamber to lubricate the planetary and opposed gears. However, with efficient utilization of lubricant, there is insufficient liquid level to provide splash lubrication of the differential gear set including the differential lock assembly so as to meet the required heavy duty functions under extreme conditions.

In accordance with the present invention, the differential gear housing 46 is provided with means for providing adequate lubricant and cooling functions from the liquid, while at the same time enabling efficient overall lubricant utilization. This function is shown particularly in FIG. 2 in which the primary flow path 90 to chamber 88 has a bleed flow path 104 extending from inlet passage 90 to the opposite side of annular piston 86 and into the interdigitated set of discs 72 and 74. The control system 100 directs a pressure supply from pressure source 102 of approximately 300 psi during engagement of the differential lock mechanism 70 but, in addition, provides a flow of a pressure level of between approximately 15-20 psi during disengagement of the differential lock mechanism 70 so as to provide a continuous flow of lubricant through passage 104 through the interdigitated discs 72 and 74. Furthermore, unlike previous differential gear housings, this differential gear housing 46 has the outer periphery substantially sealed so that the liquid lubricant flowing in through bleed passage 104 is maintained at a level within differential gear housing 46 that provides lubrication of the differential gear set, namely, the end gears 62, 64, and planetary gears 66 and 68. The liquid lubricant flows from the differential gear housing 46 past gear splines and bearings adjacent the centerline into the interior of housings 22, 24 and 26. When the differential lock mechanism 70 is actuated, the higher pressure flows into the disc set 72 and 74 to provide cooling thereof on account of the additional frictional forces.

The above arrangement allows for a significant improvement in the efficiency and effectiveness of the axle assembly 20 in that windage losses within the central housing 26 are minimized but, at the same time, adequate liquid coolant level is maintained within differential gear housing 46 to lubricate and cool the gear set and bearings, even under the most extreme conditions encountered in an off road heavy duty work machine.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An axle assembly for a power train, said axle assembly comprising: an elongated housing;
   first and second shafts journaled in said elongated housing for providing a rotary output at first outer ends thereof, said first and second shafts having inner ends thereof;
   a differential gear housing rotatably positioned within said elongated housing, the differential gear housing receiving the inner ends of said first and second shafts, and having a wall defining a bleed flow path passing through the differential gear housing;
   a ring gear fixed to said differential gear housing for receiving a rotary power input;
   a differential gear set positioned within said differential gear housing and having opposed gears fixed to the inner ends of said shafts and journaled relative to said differential gear housing and a plurality of planetary gears journaled within said differential gear housing and meshing with the opposed gears for providing a differential action;
   a fluid pressure actuated differential lock mechanism having one portion thereof fixed to said differential gear housing and the other portion thereof to one of said opposed gears;
   a source of selected fluid pressure fluidly connected to said differential lock mechanism to provide a relatively high fluid pressure input to selectively lock said differential gear housing and one of said gears, and said source of selected fluid pressure being fluidly connected to said differential lock mechanism to provide relatively low fluid pressure input to allow said differential gear housing and one of said gears to unlock, wherein said source of selected fluid pressure continuously provides lubrication through the bleed flow path to said gears between locking and unlocking of the differential lock mechanism.

2. The axle assembly as claimed in claim 1, wherein the differential lock mechanism comprises interdigitated annular plates and a piston received within said differential gear housing, said piston being pressurized on one side thereof to abut said plates in an axial direction.

3. The axle assembly of claim 2 in which the primary pressure extends to said one side of said piston and the bleed flow path extends from said primary flow passage to the interdigitated annular plates.

4. The axle assembly as claimed in claim 3, further comprising a source of fluid pressure and a controller for directing high and low fluid pressure to said differential lock mechanism.

5. The axle assembly as claimed in claim 4, wherein the fluid is a liquid lubricant.

6. The axle assembly of claim 2, wherein the low pressure is approximately 15-20 psi and the high pressure is approximately 300 psi.

7. The axle assembly as claimed in claim 2, wherein the differential gear housing is annular and is substantially closed and sealed on the outer portions thereof to direct fluid flow inward toward the center of said differential gear housing.

8. The axle assembly as claimed in claim 1, wherein the differential gear set and opposed gears are bevel gears.

9. The axle assembly as claimed in claim 1, wherein said interdigitated annular plates have projections received in slots on the inside of said differential gear housing and on the outside of said one opposed gear.

10. The axle assembly as claimed in claim 1, wherein said differential gear housing has a controlled seal so that pressurized fluid passes inward and out to lubricate at least one of said gears.

11. A work machine comprising:
  a frame;
  a prime mover mounted in said frame for providing a rotary propulsion output; a shaft extending from said prime mover for transferring the rotary output from said prime mover;
  an axle assembly including an elongated housing and first and second shafts journaled in the elongated housing for providing a rotary output to wheels at the outer ends thereof, said first and second shafts having inner ends;
  a differential gear housing rotatably positioned within said elongated housing, the differential gear housing receiving the inner ends of the first and second shafts, and having a wall defining a bleed flow path passing through the differential gear housing;
  a ring gear fixed to the differential gear housing and interconnected with the shaft extending from said prime mover;
  a differential gear set positioned within the differential gear housing and having opposed gears fixed to the inner ends of said first and second shafts and journaled relative to the differential gear housing and a plurality of planetary gears journaled within said differential gear housing and meshing with the opposed gears for providing a differential action;
  a fluid pressure activated differential lock mechanism having one portion fixed to said differential gear housing and the other portion thereof to one of said opposed gears;
  a source of selected fluid pressure fluidly connected to said differential lock mechanism to provide a relatively high fluid pressure input to selectively lock said differential gear housing and one of said gears, and said source of selected fluid pressure being fluidly connected to said differential lock mechanism to provide relatively low fluid pressure input to allow said differential gear housing and one of said gears to unlock, wherein said source of selected fluid pressure continuously provides lubrication through the bleed flow path to said gears between locking and unlocking of the differential lock mechanism.

12. The work machine as claimed in claim 4 wherein the differential lock mechanism comprises interdigitated annular plates and a piston displaceable against an end portion of said plates in response to pressure inputs.

13. The work machine as claimed in claim 12, wherein the primary pressure extends to one side of said piston and the bleed flow path extends from said one side to the interdigitated plates.

14. The work machine as claimed in claim 13, further comprising a source of pressurized fluid and a control system for selectively controlling the pressure on one side of the piston between said low and high pressure.

15. The work machine as claimed in claim 14, wherein said fluid is liquid lubricant.

16. The work machine as claimed in claim 13, wherein said differential gear housing has a controlled seal so that pressurized fluid passes inward and out to lubricate at least one of said gears.

17. The work machine as claimed in claim 12, wherein the low pressure is approximately 15-20 psi and the high pressure is approximately 300 psi.

18. The work machine as claimed in claim 12, wherein the differential gear housing is annular and substantially closed on the outer portion thereof and sealed to direct flow inward toward the central axis thereof.

19. The work machine as claimed in claim 12, wherein said differential gear set and opposed gears are bevel gears.

20. The work machine as claimed in claim 12, wherein said interdigitated annular plates have tabs extending respectively into slots on the inside of said differential gear housing and to slots on the outside of said one gear.

* * * * *